(12) United States Patent
Viklund

(10) Patent No.: US 6,783,280 B2
(45) Date of Patent: Aug. 31, 2004

(54) MECHANICAL SPLICE OPTICAL FIBER CONNECTOR HAVING A SLIDING ACTUATOR

(75) Inventor: Mark Viklund, New Milford, CT (US)

(73) Assignee: The Siemon Company, Watertown, CT (US)

( * ) Notice: Subject to any disclaimer, the term of this patent is extended or adjusted under 35 U.S.C. 154(b) by 0 days.

(21) Appl. No.: 10/282,309

(22) Filed: Oct. 28, 2002

(65) Prior Publication Data

US 2003/0086657 A1 May 8, 2003

Related U.S. Application Data

(60) Provisional application No. 60/340,659, filed on Oct. 29, 2001.

(51) Int. Cl.[7] .............................. G02B 6/38; G02B 6/36
(52) U.S. Cl. ........................................ 385/55; 385/77
(58) Field of Search ........................... 385/55, 135, 77, 385/115, 134

(56) References Cited

U.S. PATENT DOCUMENTS

| | | | |
|---|---|---|---|
| 4,923,274 A | 5/1990 | Dean | 350/96.21 |
| 5,109,460 A | * 4/1992 | Baek et al. | 385/115 |
| 5,341,448 A | 8/1994 | Huebscher | 385/97 |
| 5,394,496 A | 2/1995 | Caldwell et al. | 385/70 |
| 5,748,819 A | 5/1998 | Szentesi et al. | 385/60 |
| 5,862,289 A | * 1/1999 | Walter et al. | 385/134 |
| 5,963,699 A | 10/1999 | Tanaka et al. | 385/97 |
| 6,019,521 A | * 2/2000 | Manning et al. | 385/77 |
| 6,173,097 B1 | 1/2001 | Throckmorton et al. | 385/59 |
| 2002/0048435 A1 | 4/2002 | Scanzillo | 385/81 |

OTHER PUBLICATIONS

Advanced Custom Applications Inc. Sixth Edition, pp. 1–11.

* cited by examiner

Primary Examiner—Chandrika Prasad
(74) Attorney, Agent, or Firm—Cantor Colburn LLP

(57) ABSTRACT

A connector for a fiber optic cable includes: a sliding actuator; an inner housing having a first end and an inner channel, the sliding actuator is engaged with the inner housing; and a ferrule assembly having a first side and a second side, the first side is mounted to the first end of the inner housing, the ferrule assembly includes a fiber stub extending from the second side, the fiber stub extends within the inner channel.

18 Claims, 14 Drawing Sheets

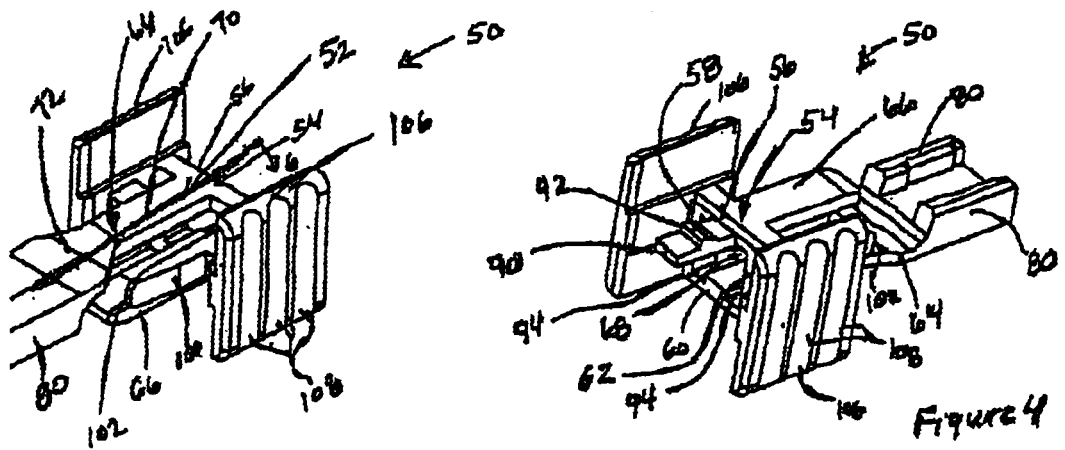

MECHANICAL SPLICE OPTICAL FIBER CONNECTOR HAVING A SLIDING ACTUATOR

CROSS-REFERENCE TO RELATED APPLICATIONS

The present application claims the benefit of the date of the earlier filed provisional application, having U.S. Provisional Application No. 60/340,659, filed on Oct. 29, 2001, which is incorporated herein in its entirety.

BACKGROUND OF THE INVENTION

An optical connector arrangement generally provides an arrangement for the mating of optical fibers, particularly, the mating of two pairs of optical fibers. The arrangement includes connectors that mate at an adapter. A fiber optical cable is terminated at each connector. The cable contains individual optical fibers having ends which, when the cable is properly terminated, are disposed within the connector and positioned to be available for mating with other optical fibers.

Proper termination of fiber optical cable to a connector is important to ensure proper functioning of the fiber connection. Improper termination of a connector can lead to increased connector attenuation and internal reflections, degrading overall connector performance. Moreover, in order to provide for proper termination, the connector must be field polished, which is a time consuming process.

Various devices and methods of fiber connector termination exist. Epoxy-based connectors employ adhesive epoxy to retain the individual optical fibers within the connector, thus properly positioning the fiber to mate with an opposing fiber. Epoxy termination, however, is time consuming and labor intensive, requiring the preparation and curing of the epoxy. Terminating a connector using adhesive epoxy can take anywhere from several minutes to an hour or more and often requires use of an epoxy curing oven and associated tools. Thus, epoxy-based termination is not particularly suited for field termination of connectors.

SUMMARY OF THE INVENTION

The above discussed and other drawbacks and deficiencies of the prior art are overcome or alleviated by a mechanical splice optical fiber connector. In an exemplary embodiment, the optical fiber connector includes: a sliding actuator; an inner housing having a first end and an inner channel, the sliding actuator is engaged with the inner housing; and a ferrule assembly having a first side and a second side, the first side is mounted to the first end of the inner housing, the ferrule assembly includes a fiber stub extending from the second side, the fiber stub extends within the inner channel.

BRIEF DESCRIPTION OF THE DRAWINGS

Referring now to the drawings wherein like elements are numbered alike in the several Figures:

FIG. 3 is a perspective view of a top view of a sliding actuator of the mechanical splice optical fiber connector of FIG. 1;

FIG. 4 is a perspective view of a bottom view of the sliding actuator of FIG. 3;

FIG. 5 is a bottom view of the sliding actuator of FIG. 3;

FIG. 6 is a cross-section view of the sliding actuator of FIG. 3;

DETAILED DESCRIPTION

Figure 1:
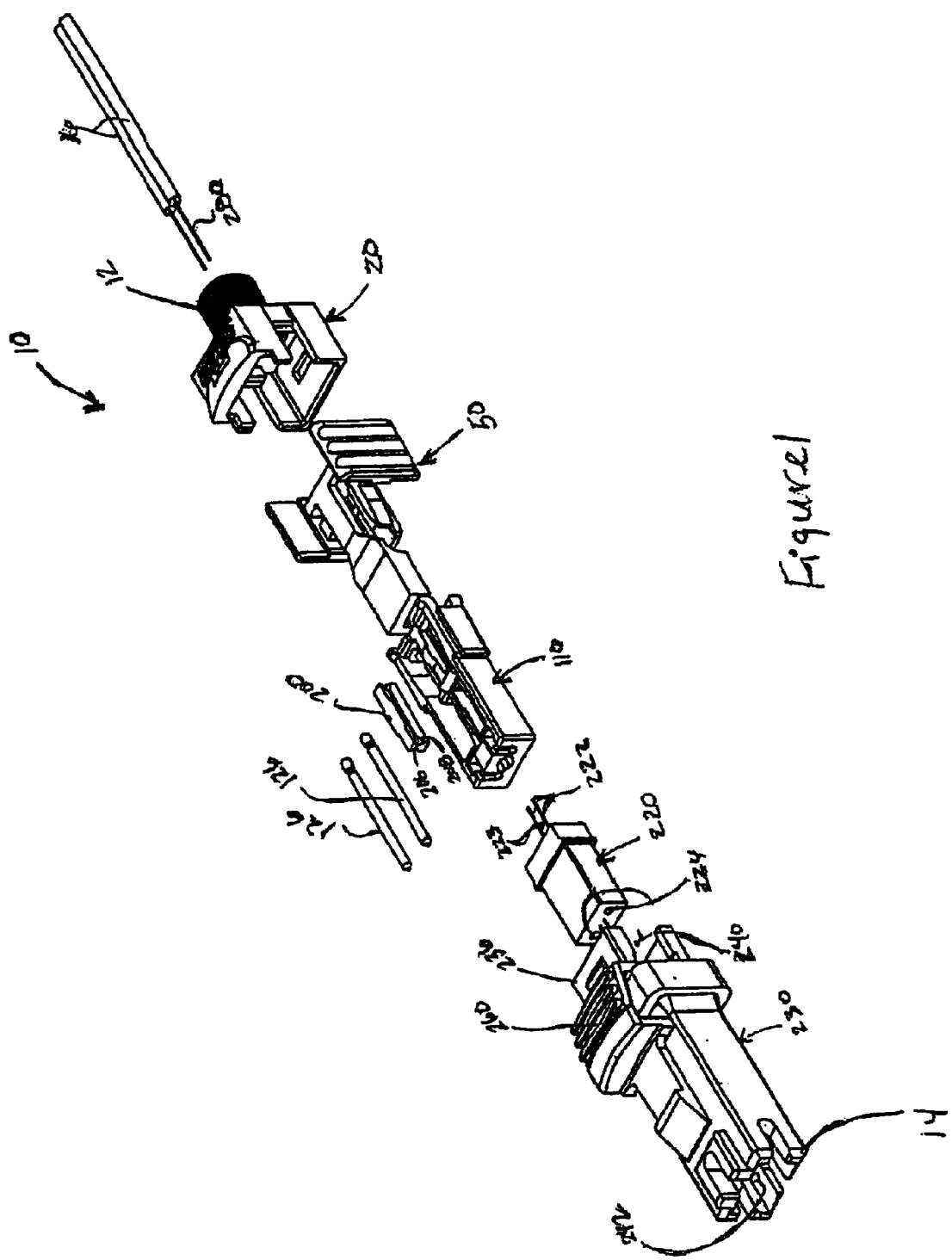
FIG. 1 is an exploded perspective view of a mechanical splice optical fiber connector.

FIG. 1 depicts a mechanical splice optical fiber connector ("connector") 10. Connector 10 includes a first end 12 and an opposing second end 14. First end 12 is formed for reception of a fiber optical cable 16. Fiber optical cable 16 includes at least one optical fiber and preferably includes two cables 16. Second end 14 is formed to mate with another connector in an adapter.

Figure 2:
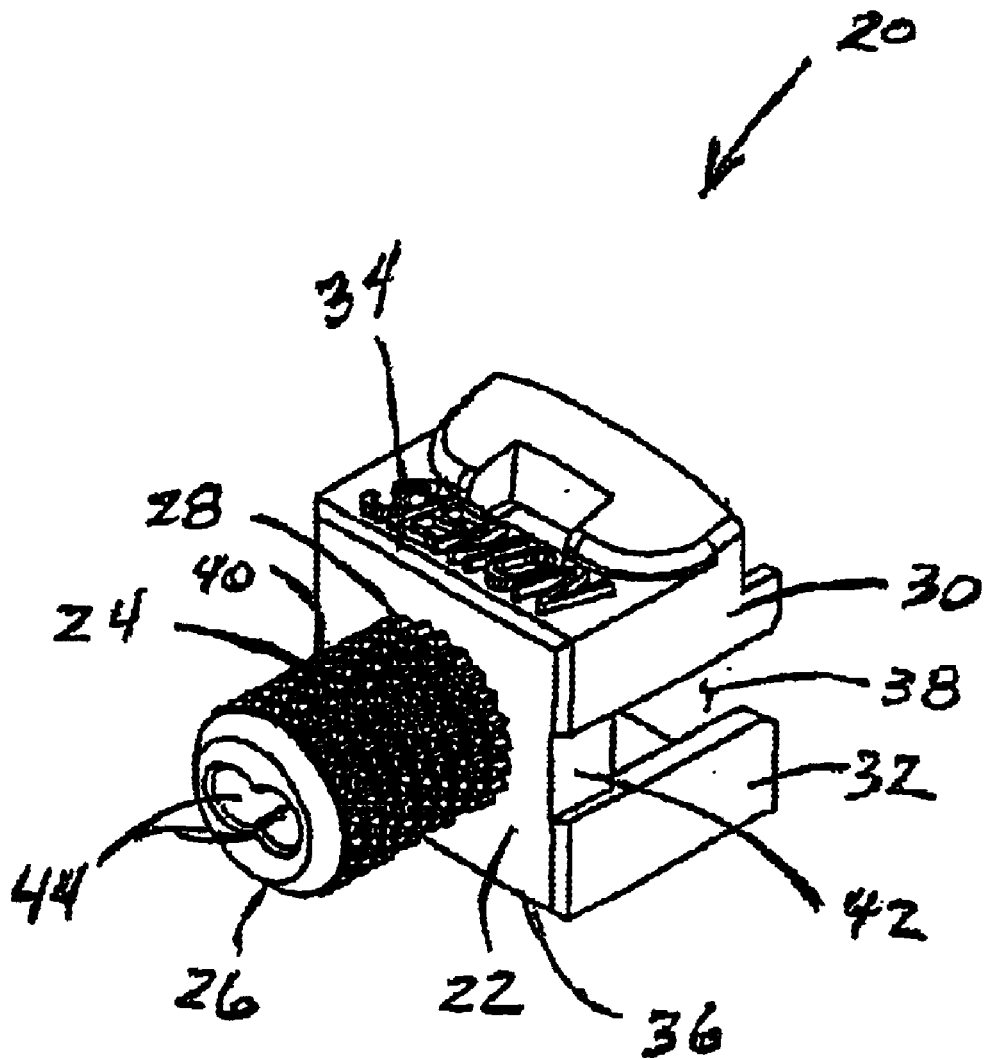
FIG. 2 is a perspective view of a rear cap of the mechanical splice optical fiber connector of FIG. 1.
Figure 7:
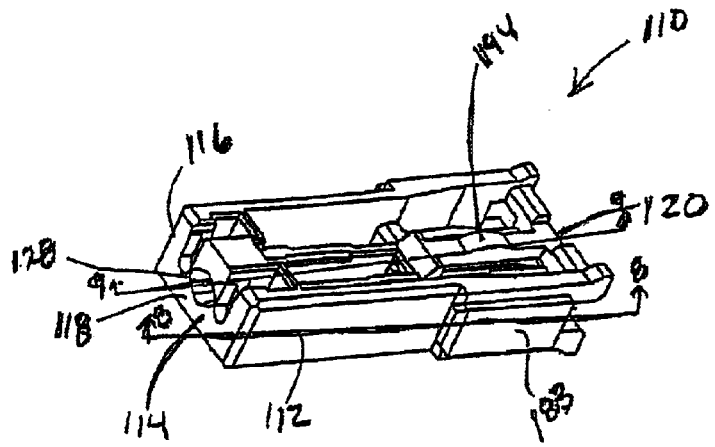
FIG. 7 is a perspective view of an inner housing of the mechanical splice optical fiber connector of FIG. 1.
Figure 8:
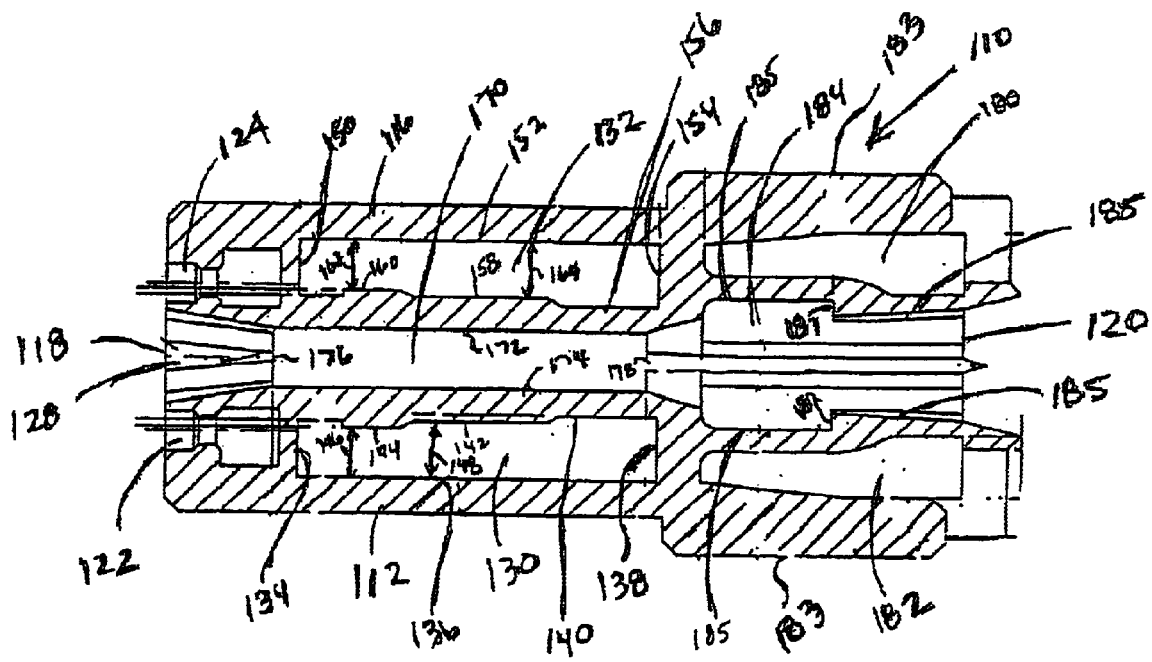
FIG. 8 is a cross-section view of the inner housing of FIG. 7.
Figure 9:
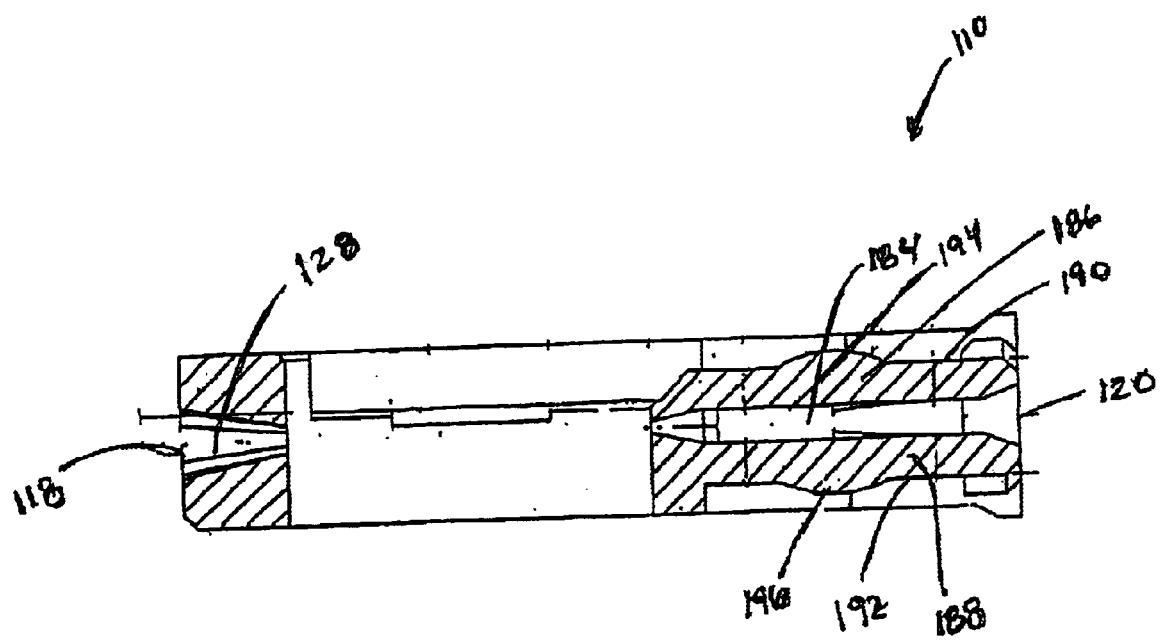
FIG. 9 is a cross-section view of the inner housing of FIG. 7.

Referring now to FIGS. 1 and 2, connector 10 includes an end cap 20. End cap 20 includes a face plate 22. Face plate 22 is a thin member and, in one embodiment, is substantially rectilinear in shape. Face plate 22 includes a cable mating portion 24 extending therefrom. Cable mating portion 24, in one embodiment, is substantially a cylindrical member connected to face plate 22. Cable mating portion 24 includes a first end 26 and a second end 28. Cable mating portion 24 is mounted to face plate 22 at second end 28 such that first end 26 extends perpendicularly from face plate 22. Cable mating portion 24 includes a cross-sectional area and a specific cross-sectional shape particularly suited for connection with a fiber optical cable as described further herein. For example, cable mating portion 24 may have a circular cross-section.

End cap 20 additionally includes two extensions 30 and 32 that extend from face plate 22. Extension 30 is u-shaped and extends outwards from face plate 22 from a first side 34. Extension 32 is also u-shaped and extends outwards from face plate 22 from an opposing second side 36. Extension 30 does not meet with the extension 32; instead a rectangular space 38 exists between extensions 30 and 32. Rectangular space 38 is located on a third side 40 and an opposing fourth side 42. Both rectangular spaces 38 are approximately the same size and located parallel to one another.

End cap 20 also includes at least one fiber passageway 44 formed therein. In an exemplary embodiment, end cap 20 includes two fiber passageways 44 formed parallel one another. Fiber passageways 44 extend through cable mating portion 24 and through face plate 22. Fiber passageways 44 are shaped and sized to facilitate the reception, passage, and retainment of optical fiber cables 16.

End cap 20 may be made of any material suitable for the applications discussed herein with respect to the scope of the present invention. More specifically, end cap 20, in one embodiment, is constructed of molded plastic. Alternatively, in another embodiment, end cap 20 is composed of a plurality of materials, for example, face plate 22 and extensions 30 and 32 are constructed of hard plastic while cable mating portion 24 is constructed of a resilient material, such as rubber. Of course, face plate 22, cable mating portion 24, and extensions 30 and 32 may be individually formed and then mounted together to assembly end cap 20 or integrally formed to define end cap 20.

Referring now to FIGS. 1 and 3–6, connector 10 also includes a sliding actuator 50. Sliding actuator 50 has a main body 52 with either a square or a rectangular shaped base 54. Base 54 has four sides 56, 58, 60, and 62. Main body 52 also includes a first projection 64, which extends from side 56 of base 54 and a second projection 66, which extends from side 60 of base 54. A channel 68 is located between first projection 64 and second projection 66.

First projection 64 includes a first section 70, a second section 72, and a third section 74. Second section 72 is located between first section 70 and third section 74 and is located on an angle from first section 70 to third section 74. First section 70 is substantially parallel and located on a different plane from third section 74. As first section 70 transitions to second section 72, first section 70 has a tapered end 76.

Third section 74 has two extensions 80 that extend generally perpendicular from third section 74. Each extension 80 has a first end 82 and a second end 84. A recess 85 is located at first end 82 and a tab 86 is located at second end 84. An edge 87 is located between recess 85 and tab 86.

Second projection 66 and first section 70 each extend about the same length from base 54. Second projection 66 has a tapered end 88 that mirrors end 76 of first section 70. A stub 90 with a prong 92 extends from side 56 of base 54.

Within channel 68, there are two grooves 94, which are separated from one another, but are also located adjacent to one another. Grooves 94 are located on first projection 64 of main body 52 and help to guide optical fiber cable 16 into sliding actuator 50.

Base 54 also has two guiding members 100 attached at sides 58 and 62. Guiding members 100 have a tapered end 102 and are located between first projection 64 and second projection 66. Guiding members 100 also have arms 104. Ears 106 are attached to arms 104. Ears 106 are parallel to guiding members 100 and may include raised members 108 to assist an operator with grasping ears 106.

Sliding actuator 50 is composed of any material suitable for applications of the piece and of connector 10 as described herein and within the scope of the present invention. Particularly, sliding actuator 50 may be integrally formed of molded plastic. Alternatively, a plurality of materials may be used to construct various components of sliding actuator 50, the components subsequently being connected to assemble sliding actuator 50.

Referring now to FIGS. 1 and 7–9, connector 10 also includes an inner housing 110. Inner housing 110 has sides 112, 114, and 116. Side 112 and 116 are parallel to each other and side 114 is perpendicular to sides 112 and 116. Inner housing 110 has a first end 118 and a second end 120. First end 118 has an aperture 122, which is located adjacent to side 112 and an aperture 124, which is located adjacent to side 116. Apertures 122 and 124 are sized to receive guide pins 126 (see FIG. 1). An opening 128 is located between apertures 122 and 124. Opening 128 is sized to receive two optical fiber cables 16.

Inner housing 110 has a cavity 130, which is adjacent to side 112, and a cavity 132, which is adjacent to side 116. Cavity 130 is defined by sides 134, 136, and 138. Sides 134 and 138 are parallel to one another and side 136 is perpendicular to both sides 134 and 138. Cavity 130 also has a side 140, which is stepped so that side 140 includes a first ledge 142 and a second ledge 144. First ledge 142 and second ledge 144 are both parallel to side 136. A distance 146 between second ledge 144 and side 136 is smaller than a distance 148 between first ledge 142 and side 136.

Cavity 132 mirrors cavity 130. Cavity 132 has straight sides 150, 152, and 154. Sides 150 and 154 are parallel to one another and side 152 is perpendicular to both sides 150 and 154. Cavity 132 also has a side 156, which is stepped so that side 156 includes a first ledge 158 and a second ledge 160. First ledge 158 and second ledge 160 are both parallel to side 152. A distance 162 between ledge 160 and side 152 is smaller than a distance 164 between ledge 158 and side 152.

Inner housing 110 also has a channel 170 that is located between cavities 130 and 132. Channel 170 is generally rectangular in shape and includes walls 172 and 174, which are generally parallel to one another. Channel 170 also includes a first end 176 and a second end 178, both of which are open.

Inner housing 110 also includes openings 180 and 182. Openings 180 and 182 are shaped to receive guiding members 100 (see FIG. 5). Outside walls 183 of openings 180 and 182 extend out further than sides 112 and 116; however, outside walls 183 are parallel to sides 112 and 116.

Inner housing 110 also includes a passageway 184 located between openings 180 and 182. Passageway 184 is defined by inner walls 185 that each include a projection 187. From second end 120 to projections 187, inner walls 185 are angled so that inner walls 185 are the most narrow at projections 187. Passageway is also defined by a side 186 and a side 188, which each have an outside wall 190 and 192. Outside walls 190 and 192 each have nubs 194 and 196 extending outwards from outside walls 190 and 192.

Inner housing 110 is composed of any material suitable for applications of the piece and of the connector 10 as described herein and within the scope of the present invention. Particularly, inner housing 110 may be integrally formed of molded plastic. Alternatively, a plurality of materials may be used to construct various components of inner housing 110, the components subsequently being connected to assemble inner housing 110.

Figure 10:
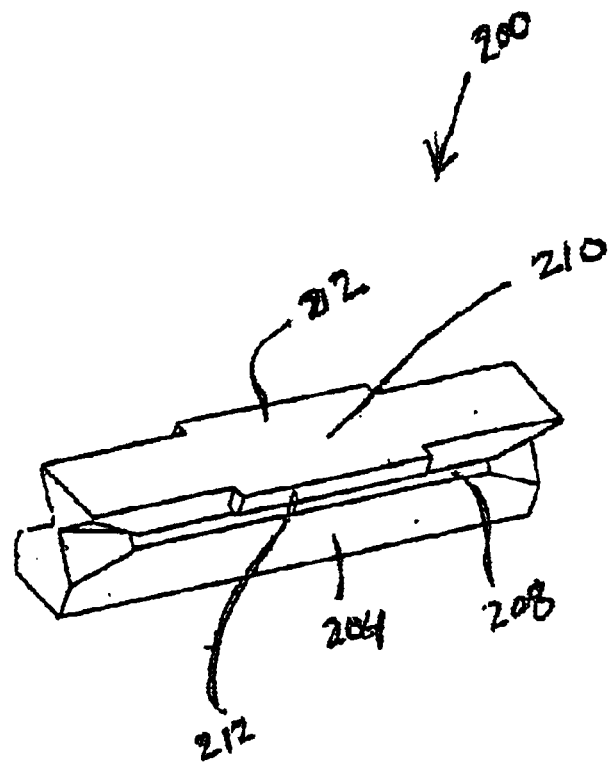
FIG. 10 is a perspective view of a v-groove member of the mechanical splice optical fiber connector of FIG. 1.
Figure 11:
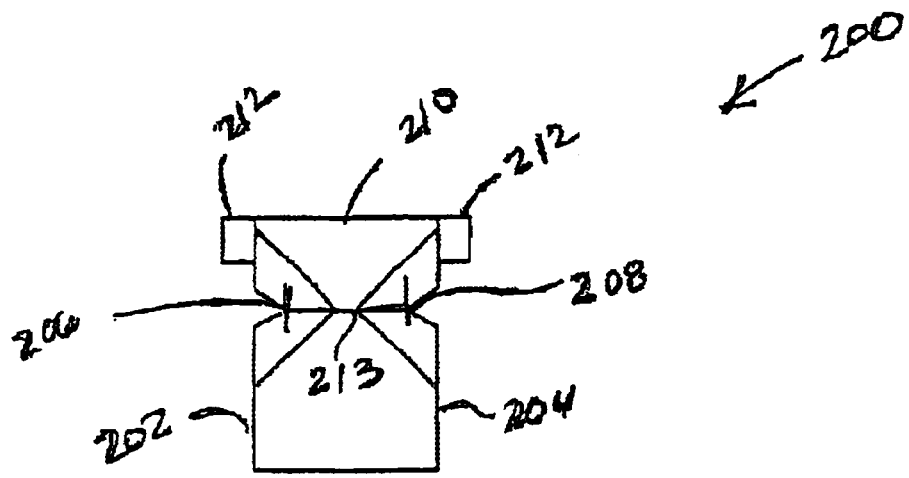
FIG. 11 is an end view of the v-groove member of FIG. 10.

Referring to FIGS. 1 and 10–11, channel 170 (see FIG. 8) receives a v-groove member 200, which is generally rectangular in shape. V-groove member 200 includes sides 202 and 204 in which each side 202 and 204 includes v-grooves 206 and 208 extending along side 202 and 204. A side 210 has two elongated extensions 212, which extend from side 202 and 204. A distance 213 between v-groove 206 and 208 is approximately 900 u, which is a standard width or pitch for optical fiber cables 16 that are located side by side.

Referring to FIG. 1, connector 10 also includes a ferrule assembly 220. Ferrule assembly 220 is preferably made from a plastic material and includes optical fiber stubs 222 fixably mounted thereto. In an exemplary embodiment, there are two optical fiber stubs 222 that are connected (e.g. bonded) to ferrule assembly 220 so as to pass therethrough. Fiber stubs 222 are of a predetermined length to extend from ferrule assembly 220. In addition, fiber stubs 222 have a distance 223 between each fiber stub 222 that is approximately 750 u, which is a standard ferrule face fiber pitch. Ferrule assembly 220 also includes alignment post passageways 224 formed there through.

Figure 12:
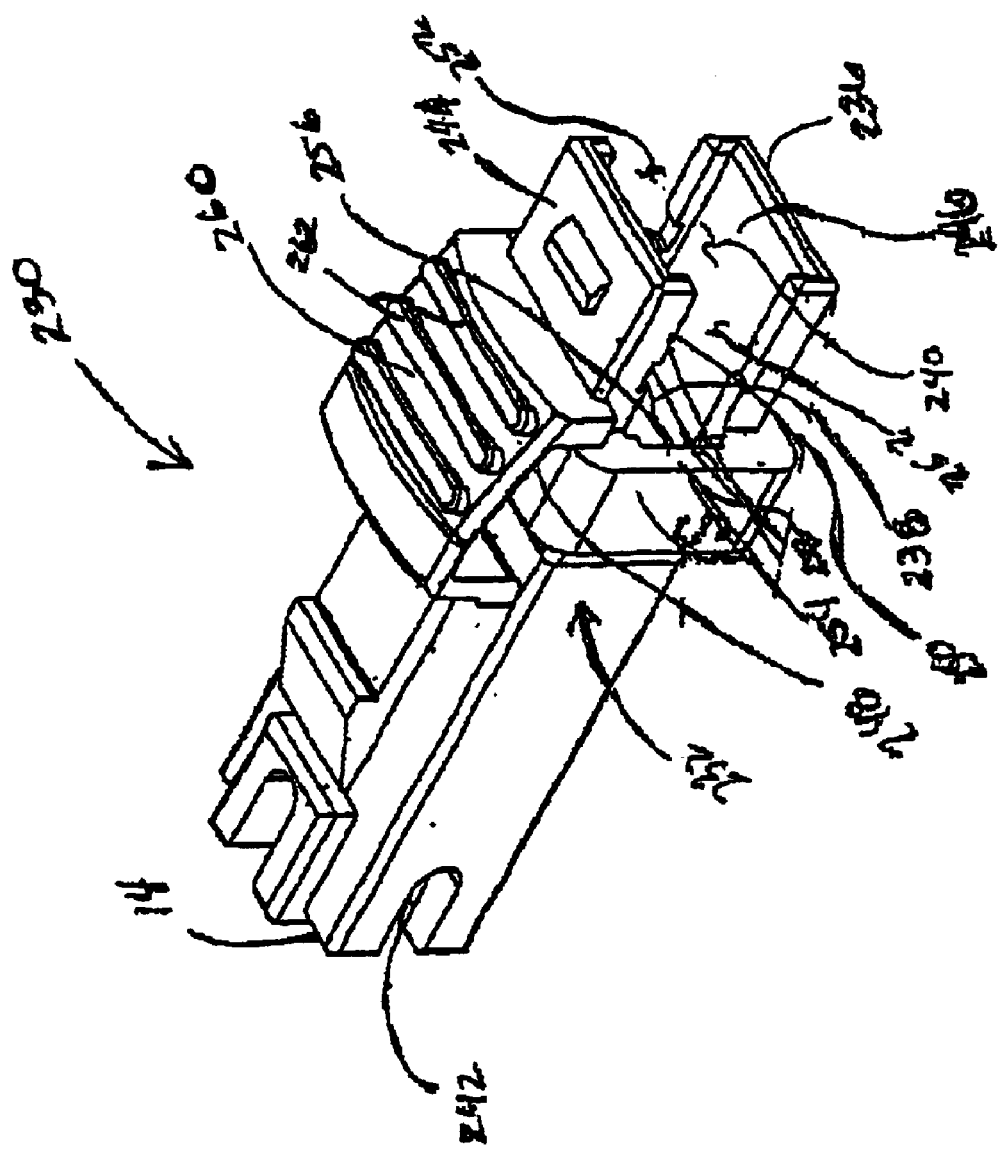
FIG. 12 is a perspective view of an outer housing of the mechanical splice optical fiber connector of FIG. 1.
Figure 13:
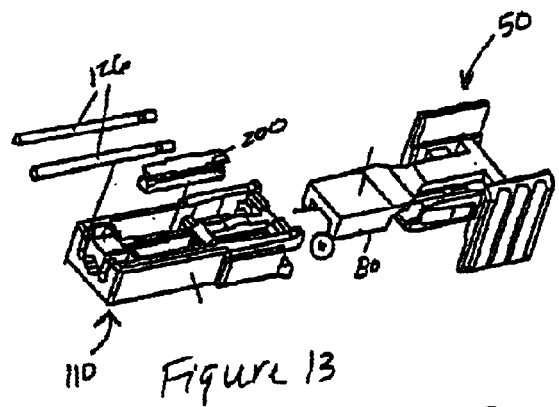
FIGS. 13–17 are perspective views that illustrate the mechanical splice optical fiber connector being assembled.
Figure 14:
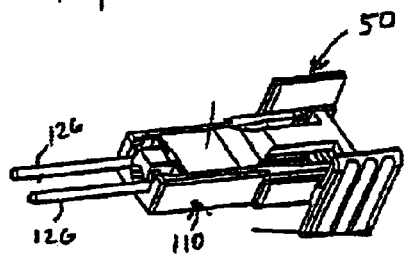
Figure 15:
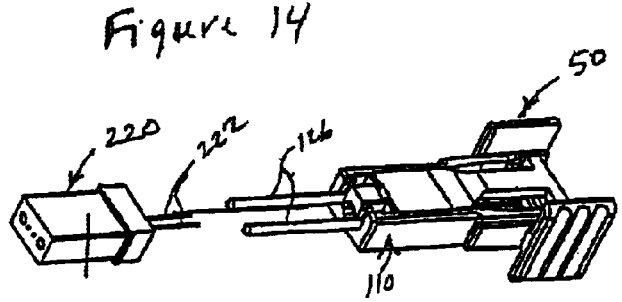
Figure 16:
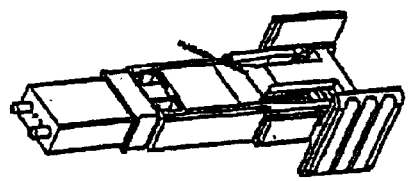
Figure 17:
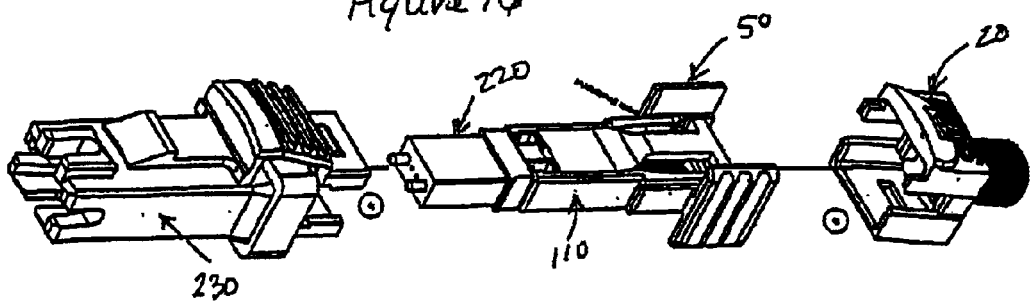
Figure 18:
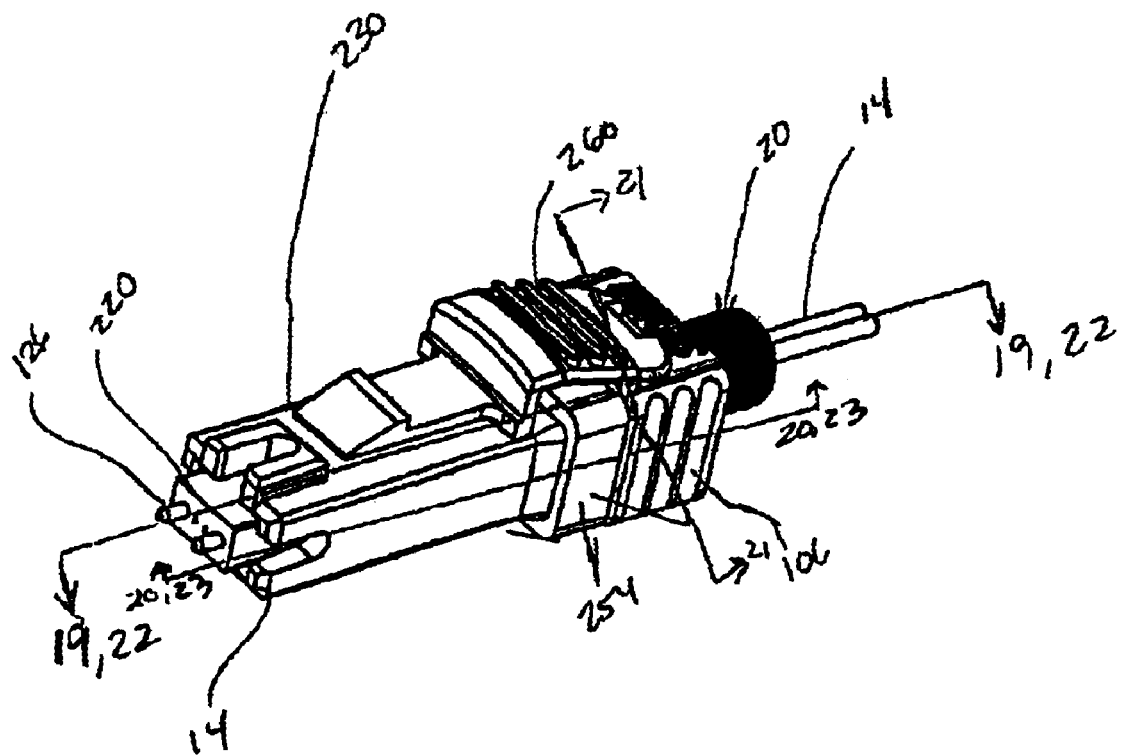
FIG. 18 is a perspective view of the mechanical splice optical fiber connector in the assembled position.

Referring now to FIGS. 1 and 12, connector 10 also includes an outer housing 230. Outer housing 230 includes a main body portion 232 with second end 14 and fiber mating end 236. Outer housing 230 is substantially a rectilinear solid having a receiving chamber 238 formed therein. Receiving chamber 238 passes through outer housing 230 from second end 14 to fiber mating end 236.

Receiving chamber 238 receives and retains the various components of connector 10 as discussed herein. Outer housing 230 includes a first opening 240 formed at second end 14 exposing receiving chamber 238. The components are received into chamber 238 through first opening 240. Outer housing 230 also includes a second opening 242 formed at fiber mating end 236 to allow for mating with other optical fibers.

Fiber mating end 236 includes two extensions 244 and 246 that extend from main body portion 232. Extension 244 is u-shaped and extends outwards from main body portion from a first side 248. Extension 246 is also u-shaped and extends outwards from main body portion 232 from an opposing second side 250. Extension 244 does not meet with the extension 246; instead a generally rectangular space 252 exists between extensions 244 and 246.

Main body portion 232 includes a band section 254, which has notches 256 located on each side 258 of band section 254. Notches 256 are sized to receive outside walls 183 (see FIG. 8) of inner housing 110. Main body portion 232 may also include a gripper 260, which has raised members 262 to assist an operator with sliding connector 10 to mate with other optical fibers.

Outer housing 230 is composed of any material suitable for applications of the piece and of the connector 10 as described herein and within the scope of the present invention. Particularly, outer housing 230 may be integrally formed of molded plastic. Alternatively, a plurality of materials may be used to construct various components of outer housing 230, the components subsequently being connected to assemble outer housing 230.

With reference to FIGS. 1–20, the assembly of connector 10 will now be discussed. Guide pins 126 are assembled into apertures 122 and 124 of inner housing 110. An index matching gel is injected into v-grooves 206 and 208 of v-groove member 200. V-groove member 200 is then inserted into channel 170 of inner housing 110. Sliding actuator 50 is then assembled with inner housing 110. Third section 74 of first projection 64 is assembled over v-groove member 200 and extensions 80 insert into cavities 130 and 132. Second end 84 of extensions 80 are located adjacent to sides 138 and 154. The shape of recess 85, edge 87, and tab 86 of extension 80 corresponds with the shape of sides 140 and 156 so that first ledges 140 and 158 rest against edges 87 and second ledges 144 and 160 rest against recess 85.

In addition, first section 70 of first projection 64 contacts outside wall 190 and second projection 66 contacts outside wall 192. Tapered end 76 of first section 70 contacts nub 194 and tapered end 88 of second projection 66 contacts nub 196. Guiding members 100 insert into openings 180 and 182.

Ferrule assembly 220 is assembled at first end 118 so that fiber stubs 222 enter opening 128. As fiber stubs 222 are fed into v-groove member, fiber stubs 222 are separated as they enter v-grooves 206 and 208 so that the width between fiber stubs 222 when fiber stubs 222 are located in v-groove member 200 is approximately 900 u. Fiber stubs 222 are located at approximately a mid-point of v-groove member 200 in v-grooves 206 and 208. Ferrule assembly 220 is adhesively attached to first end 118 of inner housing 110.

Ferrule assembly 220, inner housing 110, and sliding actuator 50 are then slide into first opening 240 of outer housing 230, through channel 238 so that ferrule assembly 220 is located at second opening 242 of outer housing. Rear cap 20 is snapped over first opening 240 to enclose connector 10.

Figure 19:
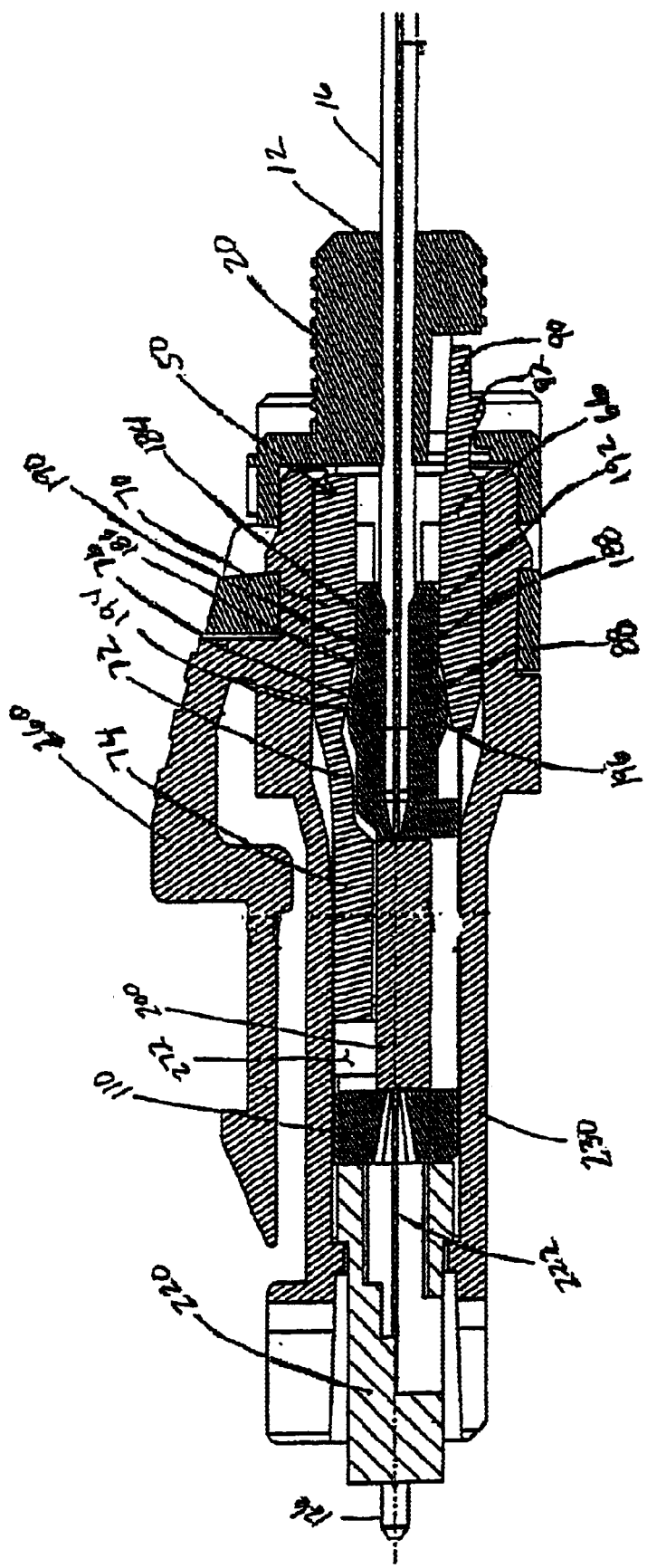
FIG. 19 is a cross-section taken across a side of the mechanical splice optical fiber connector of FIG. 18 in the open position.
Figure 20:
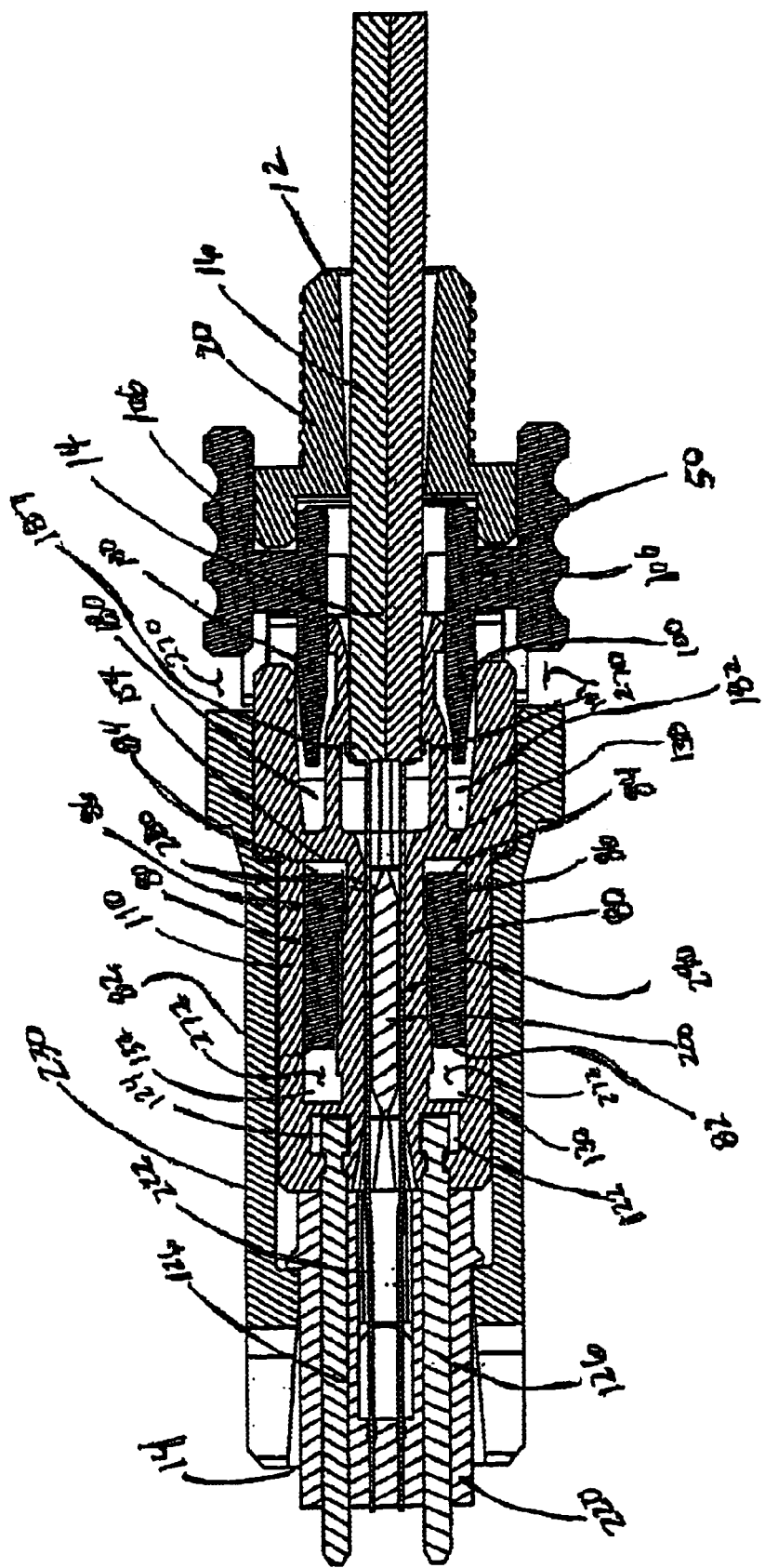
FIG. 20 is a cross-section taken across a top of the mechanical splice optical fiber connector of FIG. 18 in the open position.

FIGS. 19 and 20 illustrate connector 10 in an "open" position. Typically, an installer receives connector 10 in this state and then terminates optical fiber cable 16 to connector 10 in the field. There is a space 270 between band section 254 and ears 106. Guide members 100 are also not completely inserted into openings 180 and 182. There is also a space 272 in cavities 130 and 132 located adjacent to sides 134 and 150.

Figure 22:
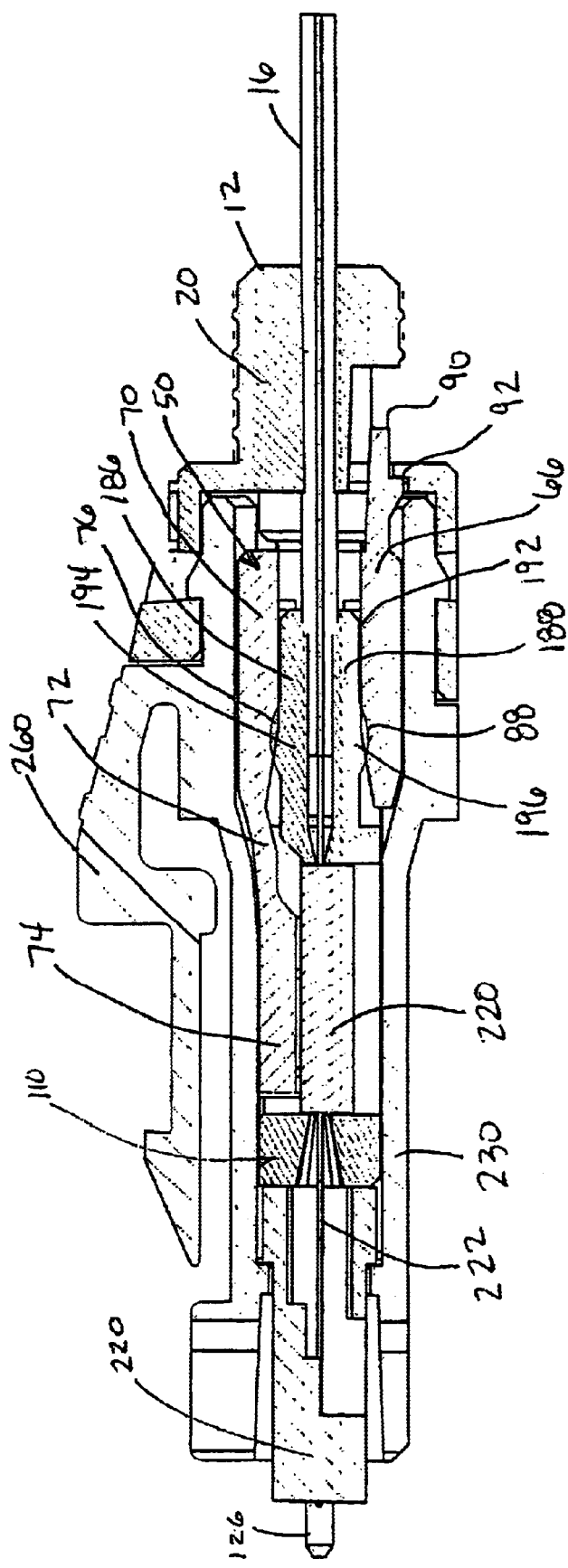
FIG. 22 is a cross-section taken across a side of the mechanical splice optical fiber connector of FIG. 18 in the closed position.
Figure 23:
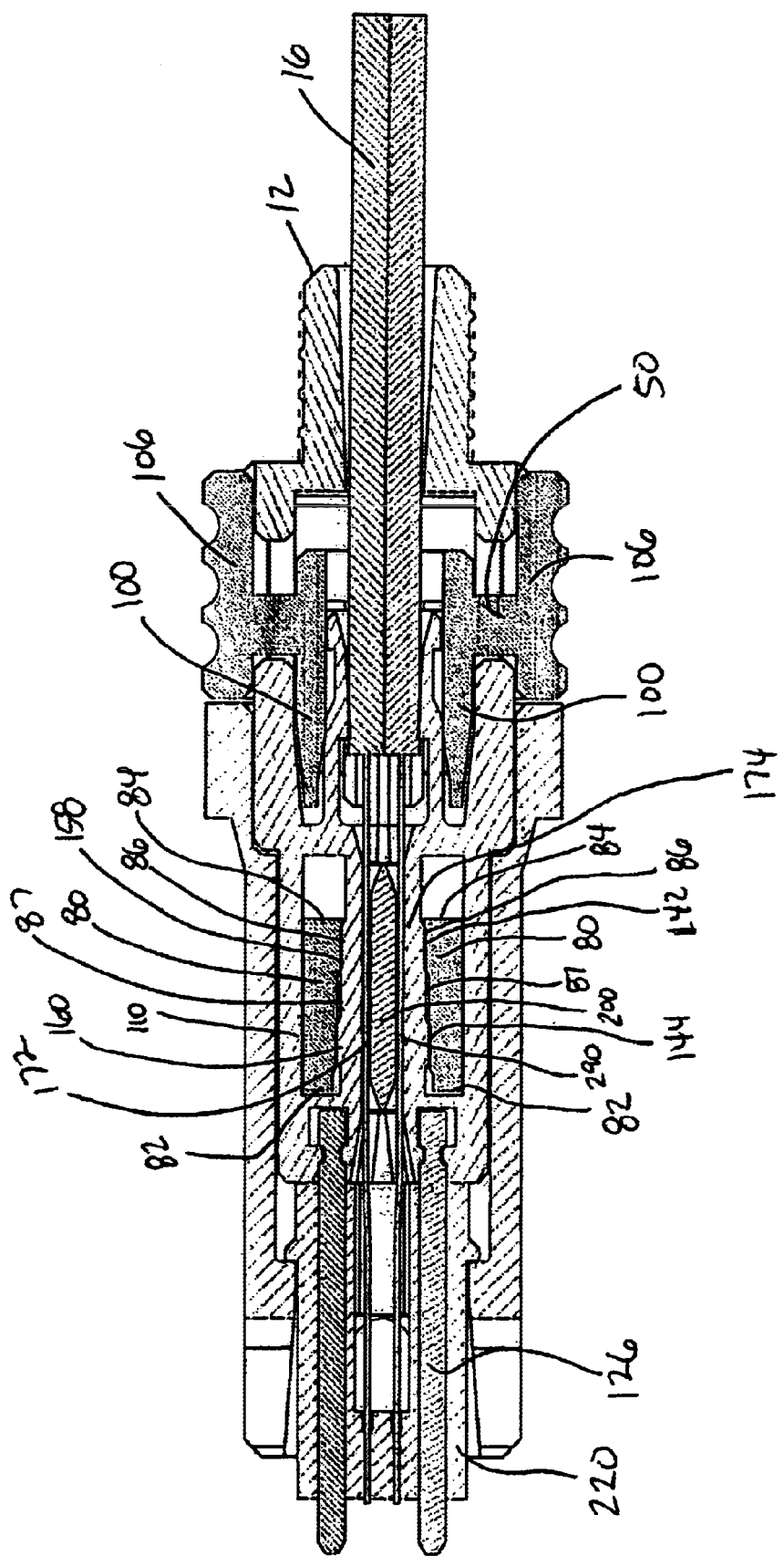
FIG. 23 is a cross-section taken across a top of the mechanical splice optical fiber connector of FIG. 18 in the closed position.

Referring to FIGS. 22 and 23, connector 10 can also be placed in a "closed" position by sliding the sliding actuator 50 within connector 10 to the left (as compared to FIGS. 19 and 20). Referring to FIG. 23, as sliding actuator 50 is moved to the left, extensions 80 move into spaces 272 and ears 106 move into spaces 270. In the closed position, extensions 80 slide to the left within cavities 130 and 132. Tabs 86 press against first ledge 142 and first ledge 158. In addition, edges 87 press against second ledges 144 and second ledge 160. The pressure against sides 140 and 156 in cavities 130 and 132 create an inward pressure along walls 172 and 174 of channel 170.

Referring to FIG. 22, as sliding actuator 50 is moved to the left (as compared to FIG. 19), tapered end 76 pushes against nub 194 and tapered end 88 pushes against nub 196. The pressure against nubs 194 and 196 creates an inward pressure within passageway 184. Guiding members 100 move into openings 180 and 182. In addition, stub 90 slides to the left so that prong 92 hooks onto inner housing 110 and holds sliding actuator 50 and inner housing 110 together.

Referring to FIGS. 19 and 20, when connector 10 is in the open position, an operator inserts optical fiber cables 16, into opening 44 of rear cap 20. Optical fiber cables 16 have been prepared so that cables 16 have an exposed end 280. Exposed end 280 slides through channel 68 of sliding actuator 50 and passageway 184 of inner housing. Exposed end 280 then passes into channel 170 of inner housing along each v-groove 206 and 208 of v-groove member until exposed ends 280 meet fiber stubs 222 at a point 290. Projections 187 grip the buffer of optical fiber cables 16 so that optical fiber cables 16 do not back out as the operator feeds optical fiber cables 16 into connector 10. In addition, inner walls 185, which are held in place by guiding members 100, support optical fiber cables 16.

Figure 21:
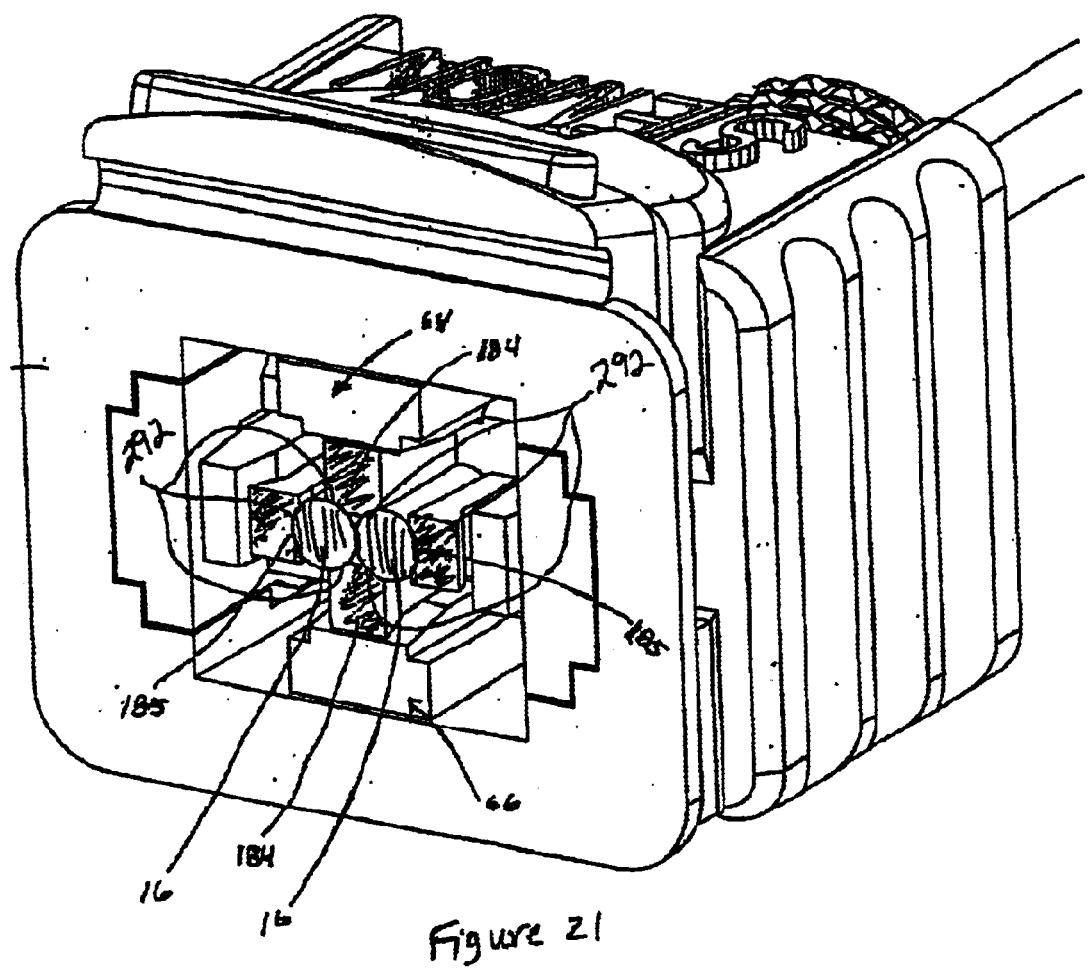
FIG. 21 is a cross-section of the mechanical splice optical fiber connector of FIG. 18.

Once exposed ends 280 contact fiber stubs 222 and are properly aligned, the operator grips ears 106 and slides the sliding actuator 50 to the closed position. The pressure within channel 170 and v-grooves 206 and 208 holds fiber stubs 222 and exposed ends 280 in place. The pressure within passageway 184 grips optical fiber cables 16 and holds cables 16 in place and provides strain relief. The gripping action in channel 170 occurs independently from the gripping action in passageway 184, which provides strain relief to optical fiber cables 16 and exposed end 280. In addition, as seen in FIG. 21, each optical fiber cable 16 is held at three areas 292 around optical fiber cable 16.

In an exemplary embodiment, after the operator installs optical fiber cable 16 into connector 10 and before the operator moves sliding actuator 50 to the closed position, the operator may use a visual fault locator. The visual fault locator projects a red light into second end 14. The red light transmits through ferrule assembly 220 along fiber stub 222. If the exposed end 280 is not butted up to fiber stub 222, the red light will transmit through sliding actuator 50, rather than through exposed end 280. If light does not transmit through exposed end 280, there will be a red glow at gripper 260. The red glow indicates that there is a faulty connection between fiber stubs 222 and exposed end 280.

Connector 10 can also be de-latched so that optical fiber cables 16 can be removed from connector 10. A device, such as a screwdriver, pushes against stub 90 so that prong 92 releases from inner housing 110 and sliding actuator 50 can be slid to the right. Once sliding actuator 50 has been slid to the right, connector 10 is then in the open position.

The connector 10 provides for a simple, quick, and effective termination of optical fiber cables 16 thereto. Each exposed end 280 and each optical fiber cable 16 are retained individually and independently with a single activation motion. By individually retaining optical fiber cable 16, the retention ensures that optical fiber cable 16 will not "back out" from connector 10.

In addition, a benefit of connector 10 is that connector 10 eliminates the polishing procedure that occurs in the field because ferrule assembly 220 is polished in the factory. In addition, because fiber stubs 222 are installed in v-groove member 200 with a width or space of 900 u, the width between exposed ends do not need to be adjusted to properly abut fiber stubs 222.

Connector 10 provides an easy entry for the fiber optical cable to be locked into place with a single activation motion, without the use of adhesives and without the use of a tool. In addition, the connector may be terminated rapidly and accurately in the field. Likewise, the connector termination may be disassembled quickly and easily without necessitating the use of tools. Moreover, gripper 260 provides more finger surface area and an improved angle for improved unlatching from the adapter.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A connector for a fiber optic cable comprising:
    a sliding actuator;
    an inner housing having a first end and an inner channel, said sliding actuator is engaged with said inner housing; and
    a ferrule assembly having a first side and a second side, said first side is mounted to the first end of said inner housing, said ferrule assembly includes a fiber stub extending from said second side, said fiber stub extends within said inner channel,
    wherein said sliding actuator has an open position and a closed position, and when said sliding actuator is in said closed position, the fiber optic cable is retained at a first location and a second location and when said sliding actuator is in said open position, the fiber optic cable is not grinned at said first location and said second location,
    said sliding actuator includes an extension that is adapted for sliding said sliding actuator between said open position and said closed position and vice versa, said extension is accessible from outside of said inner housing.

2. The connector of claim 1, further comprising a housing portion having a first end, a second end, and a cavity formed therein, the second end is adapted to receive the fiber optic cable,
    wherein said sliding actuator, said inner housing, and said ferrule assembly are disposed within said cavity so that said ferrule assembly is located at said first end.

3. The connector of claim 1, wherein said inner housing includes a v-groove member having two sides and v-grooves extending along said sides, said v-groove member is disposed at said inner channel.

4. The connector of claim 3, wherein fiber stubs are disposed at said v-grooves.

5. The connector of claim 4, wherein fiber stubs extend to approximately a mid-point of said v-grooves.

6. The connector of claim 4, wherein said first location is disposed at approximately said mid-point of said v-grooves.

7. The connector of claim 1, wherein said sliding actuator includes a base having a first projection and a second projection extending from said base, said first projection and said second projection define a channel.

8. The connector of claim 7, wherein said first projection is shaped to slideably engage said inner housing.

9. The connector of claim 7, wherein said inner housing includes a passageway defined by walls having nubs.

10. The connector of claim 9, wherein said second location is disposed approximately at said passageway at said nubs.

11. The connector of claim 9, wherein said first projection and said second projection are shaped to slideably engage said nubs.

12. The connector of claim 1, wherein said ferrule assembly is adhesively attached to said inner housing.

13. The connector of claim 1, further comprising guide posts that extend through said ferrule assembly to said inner housing.

14. The connector of claim 1, wherein said first location is located at an exposed end of the fiber optic cable and said second location is located at a jacket of the fiber optic cable.

15. The connector of claim 1, wherein, at said second location, when the sliding actuator is in the closed position, the fiber optic cable is gripped at three areas around the fiber optic cable.

16. The connector of claim 1, wherein the fiber optic cable includes two fiber optic cables, wherein each fiber optic cable is retained independently.

17. The connector of claim 1, wherein said inner housing includes a projection for holding the fiber optic cable in place while in said open position.

18. A method of terminating a first fiber optic cable, the method comprising:
    exposing an end of the first optical fiber cable;
    passing said end into a channel that is disposed in a housing;
    meeting said end with a fiber stub; and
    sliding an actuator by an extension that extends outside of said housing to a closed position so that the first optical cable is held in place by pressure at a first location and a second location.

* * * * *